US006473365B2

(12) United States Patent
Joh et al.

(10) Patent No.: US 6,473,365 B2
(45) Date of Patent: Oct. 29, 2002

(54) SUPPORTING STRUCTURE OF HYDROPHONES FOR TOWED ARRAY SONAR SYSTEM

(75) Inventors: Chi Young Joh, Masan (KR); Goon Chill Kim, Changwon (KR); O Cho Kwon, Gimhae (KR)

(73) Assignee: Agency for Defense Development, Daejon (KR)

( * ) Notice: Subject to any disclaimer, the term of this patent is extended or adjusted under 35 U.S.C. 154(b) by 0 days.

(21) Appl. No.: 09/919,736

(22) Filed: Aug. 1, 2001

(65) Prior Publication Data

US 2002/0015359 A1 Feb. 7, 2002

(30) Foreign Application Priority Data

Aug. 4, 2000 (KR) .................................. 2000-0045250

(51) Int. Cl.[7] .................................................. G01V 1/38
(52) U.S. Cl. ......................... 367/154; 367/20; 367/176
(58) Field of Search .......................... 367/20, 153, 154, 367/176; 174/101.5

(56) References Cited

U.S. PATENT DOCUMENTS

| 4,160,229 A | 7/1979 | McGough |
| 4,491,939 A | 1/1985 | Carpenter |
| 4,554,650 A | * 11/1985 | Brown et al. ................ 367/154 |
| 4,689,774 A | * 8/1987 | Cameron ...................... 367/20 |
| 5,251,182 A | 10/1993 | Carpenter |
| 5,745,436 A | * 4/1998 | Bittleston ..................... 367/20 |
| 5,902,430 A | 5/1999 | Carpenter et al. |

FOREIGN PATENT DOCUMENTS

DE 1548446 * 5/1970

* cited by examiner

*Primary Examiner*—Ian L. Lobo
(74) *Attorney, Agent, or Firm*—Scully, Scott, Murphy & Presser

(57) ABSTRACT

A support structure of hydrophones for a towed array sonar system includes elastic members arranged in each sensor package and adapted to support a hydrophone received in the sensor package while attenuating vibrations transmitted to the sensor package. External vibrations, such as vibrations generated due to the running of a towing vessel or vibrations induced due to motions of a towing cable, which are irrespective of acoustic waves reflected by a target moving underwater, are attenuated by the hydrophone support structure during the transmission thereof from the sensor package to the hydrophones, so that the hydrophones are suppressed from vibrating due to the external vibrations. Accordingly, it is possible to reduce noise included in output signals of the hydrophones, thereby achieving an improvement in the sensing performance of the towed array sonar system.

16 Claims, 5 Drawing Sheets

SUPPORTING STRUCTURE OF HYDROPHONES FOR TOWED ARRAY SONAR SYSTEM

BACKGROUND OF THE INVENTION

1. Field of the Invention

The present invention relates to a supporting structure of hydrophones for a towed array sonar system, and more particularly to a supporting structure of hydrophones for reducing unnecessary vibrations transmitted to the hydrophone used to sense acoustic waves underwater, and thus reducing output noises, thereby improving the sensing performance of a towed array sonar system.

2. Description of the Related Art

A towed array sonar system (TASS) is widely used in military and nonmilitary fields for an underwater geological survey and sensing of targets moving underwater. FIG. 1 schematically illustrates the configuration and using condition of such a towed array sonar system. Referring to FIG. 1, a towed array acoustic module M, which is a construction consisting of several hundred sensor packages 3 aligned with one another in the form of a straight line while respectively carrying hydrophones (not shown) therein, is connected at one end thereof to a towing cable C extending from the stern of a towing vessel S. A tail rope T is connected to the other end of the towed array acoustic module M. This towed array acoustic module M is used underwater while being towed by the towing vessel S.

The towed array acoustic module M includes several hundred hydrophones uniformly spaced apart from one another and received in an elastic hose 6 filled with an insulating oil 5. Each hydrophone is fixedly mounted in an associated one of the sensor packages 3. These sensor packages 3 are connected to one another by support ropes (not shown), respectively. Thus, several hundred sensor packages 3 are carried in the interior of the elastic hose 6 while being uniformly spaced apart from one another. In order to firmly support each hydrophone by an associated one of the sensor packages 3, an open cell foam or closed cell foam (sponge) is conventionally used. In this case, the hydrophone is wrapped up in the open cell foam or closed cell foam, and the resultant structure is fitted in the sensor package 3 having a hollow structure.

In the towed array sonar system having the abovementioned arrangement, an acoustic wave reflected by the seabottom or a target moving underwater reaches the elastic hose 6, and is then coupled to and received by the hydrophones via the insulating oil 5. Each hydrophone converts the received acoustic wave into an electrical signal which is, in turn, outputted.

However, the hydrophones are configured to generate an electrical signal not only in response to an acoustic wave, but also in response to motions of those hydrophones. For this reason, when mechanical vibrations, which may be generated due to vibrations induced due to motions of the towing vessel S and motions of the towing cable C and tail rope T, are undesirably transmitted to a hydrophone, they are exhibited in the form of noises in the signal finally outputted from the hydrophone. In this case, there may be a degradation in the sensing performance of the sonar system. Practically, conventional towed array acoustic modules have such a problem. Although the hydrophones are connected to the towing cable C having a length of several hundred to several thousand meters in order to minimize the effect of radiation noises generated from the it towing vessel S, they are subjected to an accelerated motion due to unstable motions or vibrations of the towing vessel S, vibrations induced by motions of the towing cable C and the tail rope T, that is, vibrations resulting from swirling flows or strumming vibrations. As a result, noises are exhibited in output signals of the hydrophones, thereby degrading the sensing performance of the towed array sonar system.

As mentioned above, in the acoustic module M of the conventional towed array sonar system, each hydrophone is fitted in an associated one of the sensor packages 3 in a state of being wrapped up in an open cell foam or sponge. These sensor packages 3 are connected to one another by support ropes (not shown) while being uniformly spaced apart from one another. In this arrangement, unstable motions and vibrations of the towing vessel S, vibrations induced by motions of the towing cable C and tail rope T, that is, vibrations externally generated, are transmitted to the hydrophones via the open cell foam or sponge as they are, thereby resulting in motions of the hydrophones. As a result, the output signals of the hydrophones receiving these vibrations contain an increased fraction of noise. Such an increased fraction of noise in output signals resulting from the above mentioned two mechanisms causes a degradation in the sensing performance of the towed array sonar system.

SUMMARY OF THE INVENTION

Therefore, the present invention has been proposed in view of the above mentioned problems involved in conventional towed array sonar systems, and an object of the invention is to provide a towed array sonar system capable of suppressing hydrophones from vibrating due to external vibrations such as vibrations generated due to the running of a towing vessel used in association with the towed array sonar system or vibrations induced by motions of a towing cable connected between the towed array sonar system and the towing vessel, thereby allowing those hydrophones to have low-noise characteristics providing an improved sensing performance.

Another object of the present invention is to provide a support structure of hydrophones, which supports the hydrophones in a state of respectively being firmly held in sensor packages, using a mechanism capable of suppressing those hydrophones from vibrating due to external vibrations, thereby improving the sensing performance of a towed array sonar system to which the hydrophones are applied.

In order to accomplish these objects, the present invention provides in a towed array acoustic module for a towed array sonar system including a plurality of sensor packages aligned in an elastic hose filled with an insulating oil, the sensor packages being connected to one another and supported by support ropes while being spaced apart from one another, and a plurality of hydrophones carried in an associated one of the sensor packages, a hydrophone support structure comprising: at least one elastic member arranged in an associated one of the sensor packages and adapted to support an associated one of the hydrophones in the associated sensor package while attenuating vibrations transmitted to the associated sensor package.

The elastic member comprises an annular hydrophone fixing portion fixedly mounted to the associated hydrophone, an annular sensor package fixing portion fixedly mounted to the associated sensor package, and elastic support portions each connected between the hydrophone fixing portion and the sensor package fixing portion and adapted to attenuate vibrations.

The elastic support portions of the elastic member are symmetrically arranged together in a circumferential direction around the associated hydrophone.

The elastic member is configured to allow a structure comprising the elastic member, the associated hydrophone and the insulating oil to have a natural frequency not higher than a frequency band of acoustic waves to be received by the associated hydrophone.

BRIEF DESCRIPTION OF THE DRAWINGS

The above objects, and other features and advantages of the present invention will become more apparent from the following detailed description taken in conjunction with the drawings, in which:

FIGS. 3a and 3b are cross-sectional views of one assembly including one hydrophone, one sensor package, and elastic members, respectively, in which FIG. 3a is a cross-sectional view taken in a radial direction whereas FIG. 3b is a cross-sectional view taken along line A—A in FIG. 3a;

FIGS. 4a and 4b illustrate a detailed configuration of each elastic member, respectively, in which FIG. 4a is a front view whereas FIG. 4b is a cross-sectional view taken along line B—B in FIG. 4a;

FIGS. 6a and 6b are cross-sectional views of an assistant member used to fixedly mount the elastic members to the sensor package in accordance with the present invention, respectively, in which FIG. 6a is a cross-sectional view taken in a radial direction whereas FIG. 6b is a cross-sectional view taken along line C—C in FIG. 6a;

DETAILED DESCRIPTION OF THE PREFERRED EMBODIMENTS

Now, preferred embodiments of the present invention will be described in detail, with reference to the annexed drawings.

Figure 1:
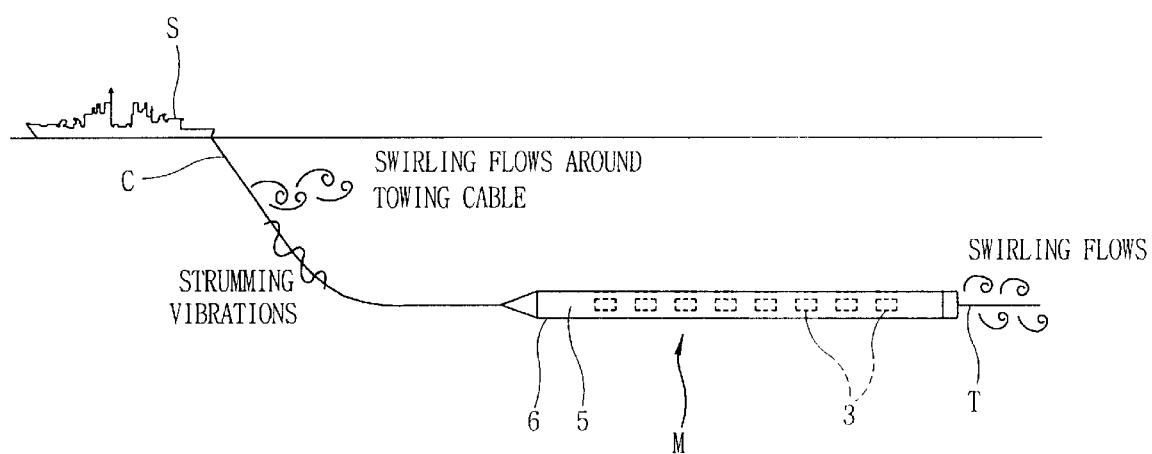
FIG. 1 is a schematic view illustrating the configuration and using condition of a towed array sonar system.
Figure 2:
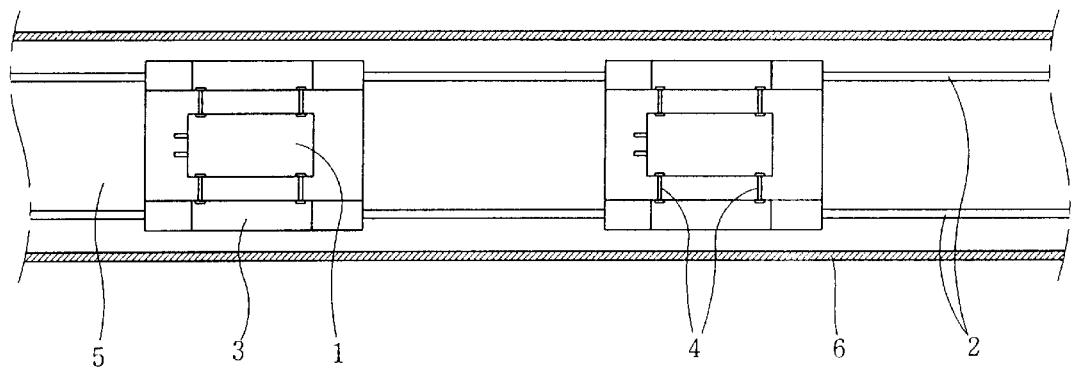
FIG. 2 is a schematic view illustrating a part of a towed array acoustic module including a plurality of hydrophones each fixedly mounted in a sensor package by a hydrophone support structure according to an embodiment of the present invention.

FIG. 2 schematically illustrates a part of a towed array acoustic module including a plurality of hydrophones each fixedly mounted in a respective sensor package by a hydrophone support structure according to an embodiment of the present invention. Referring to FIG. 2, sensor packages 3 are supported by support ropes 2 while being uniformly spaced apart from one another. A hydrophone 1 is supported by elastic members 4 in the interior of each sensor package 3. An elastic hose 6 filled with an insulating oil 5 surrounds a plurality of aligned and uniformly spaced assemblies each consisting of one hydrophone 1, one sensor package 3, and elastic members 4 supporting the hydrophone 1 in the sensor package 3.

Figure 3A:
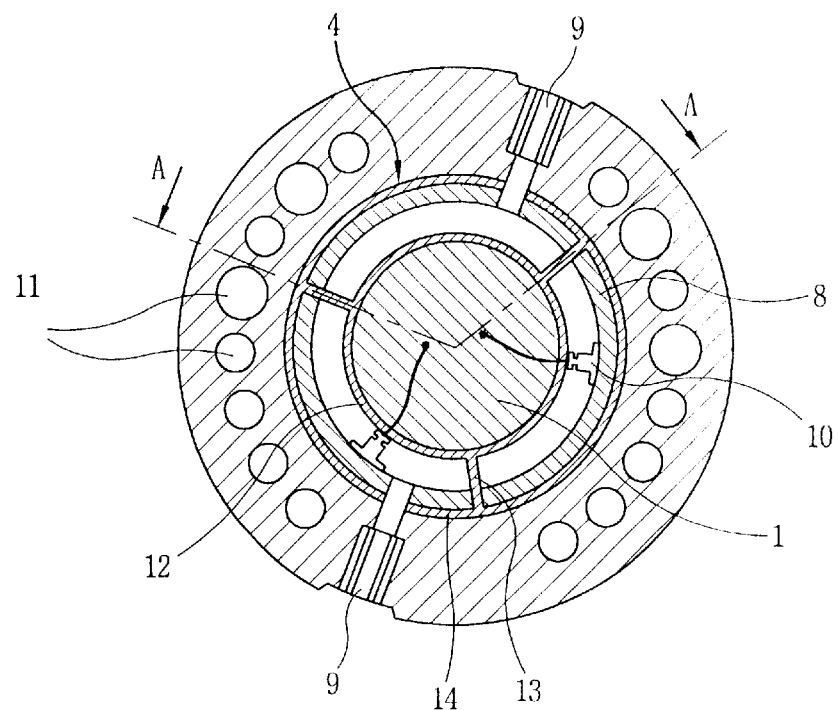
Figure 3B:
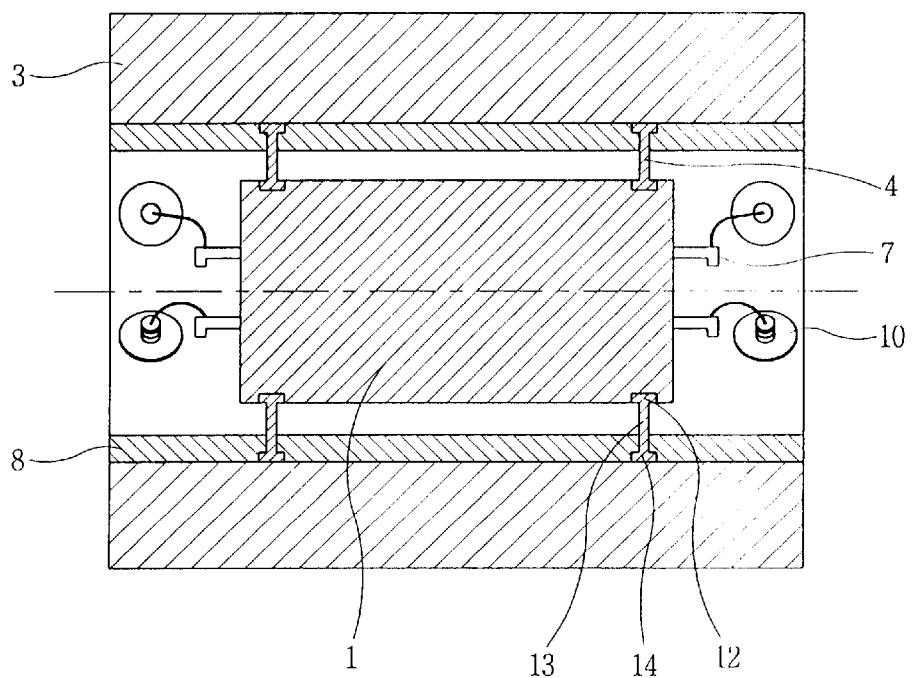
Figure 4A:
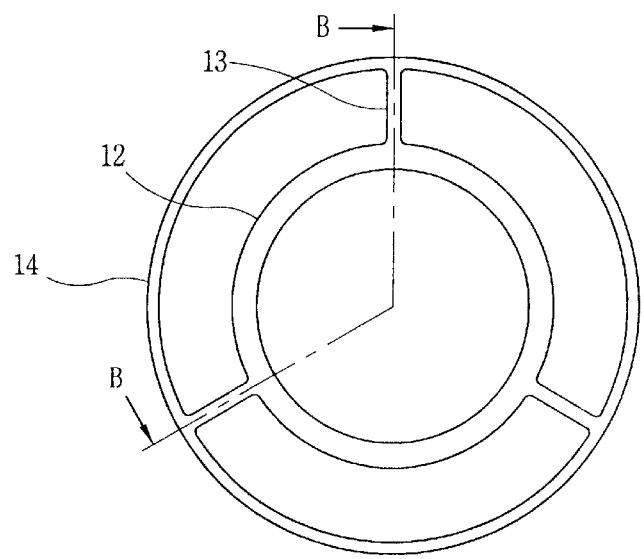
Figure 4B:
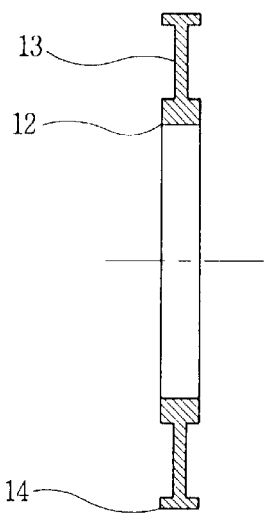

FIGS. 3a and 3b are cross-sectional views of one assembly including one hydrophone 1, one sensor package 3, and elastic members 4 supporting the hydrophone 1 in the sensor package 3, as shown in FIG. 2, respectively. FIG. 3a is a cross-sectional view taken in a radial direction whereas FIG. 3b is a cross-sectional view taken along line A—A in FIG. 3a. As shown in FIGS. 3a and 3b, the hydrophone 1 is mounted in the interior of the sensor package 3 by the elastic members 4. A detailed configuration of each elastic member 4 is illustrated in FIGS. 4a and 4b which are a front view and a cross-sectional view taken along line B—B of the front view, respectively. As shown in FIGS. 4a and 4b, each elastic member 4 includes an annular hydrophone fixing portion 12 fixedly mounted to the hydrophone 1, and an annular sensor package fixing portion 14 fixedly mounted to the sensor package 3 or an assistant member 8 attached to the inner surface of the sensor package 3. The elastic member 4 also includes elastic support portions 13 each connected radially between the hydrophone fixing portion 12 and the sensor package fixing portion 14 to serve as an elastic body.

Figure 5:
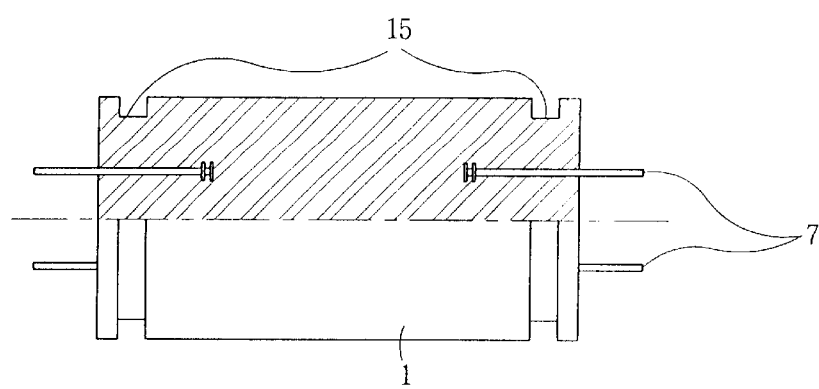
FIG. 5 is a partially-sectioned side view of one hydrophone, to which the present invention is applied, in which the upper half portion of the hydrophone is viewed in a cross-sectioned state.

FIG. 5 is a partially-sectioned side view of one hydrophone 1 in which the upper half portion of the hydrophone 1 is viewed in a cross-sectioned state. As shown in FIG. 5, the hydrophone 1 is provided in the outer surface thereof with annular fitting grooves 15 each adapted to receive the annular hydrophone fixing portion 12 of one elastic member 4. The fitting grooves 15 are arranged at or proximate the opposite ends of the hydrophone 1, respectively. In FIGS. 3a, 3b and 5, reference numeral 7 designates signal output terminals adapted to output electrical signals from the hydrophone 1.

Figure 6A:
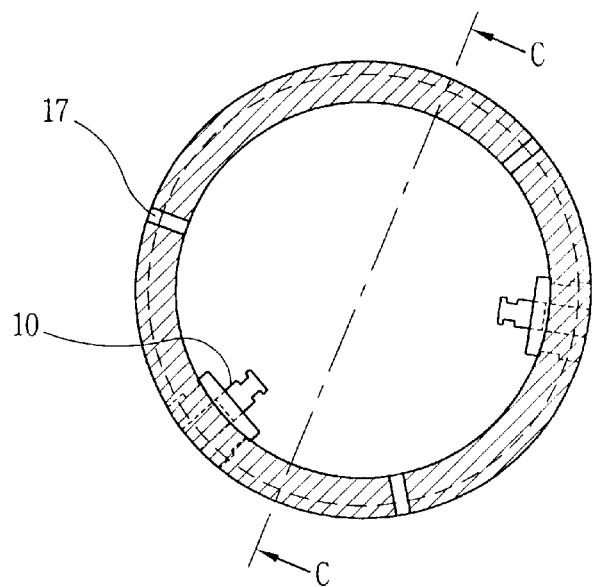
Figure 6B:
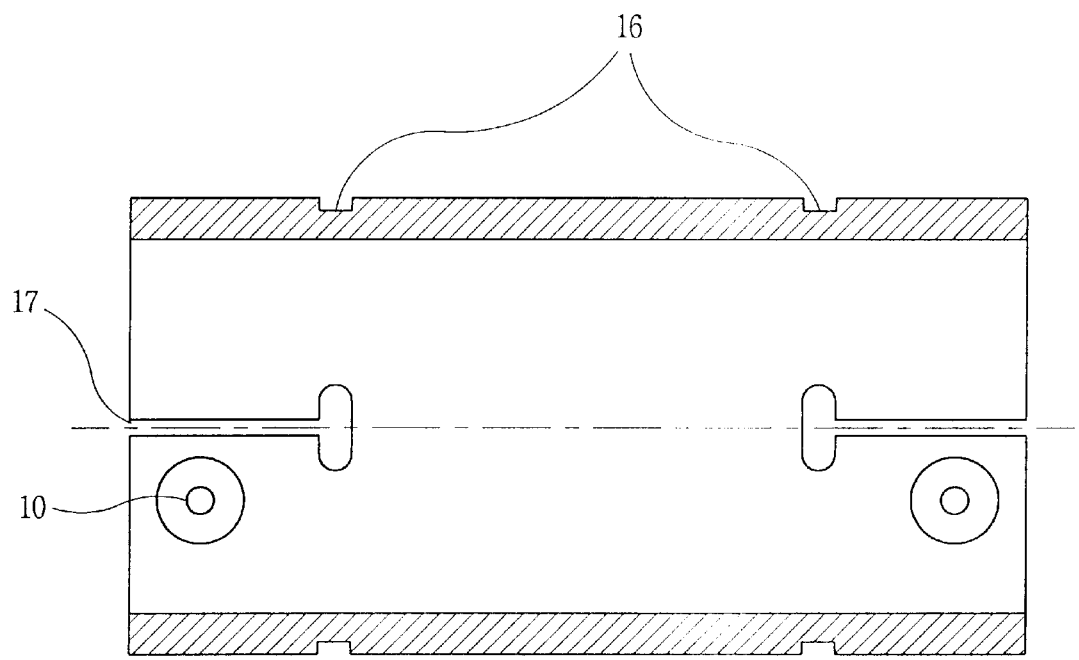

FIGS. 6a and 6b are cross-sectional views of the assistant member 8 shown in FIGS. 3a and 3b and used in accordance with the illustrated embodiment of the present invention, respectively. FIG. 6a is a cross-sectional view taken in a radial direction whereas FIG. 6b is a cross-sectional view taken along line C—C in FIG. 6a. As shown in FIGS. 6a and 6b, the assistant member 8 is provided in the outer surface thereof with annular fitting grooves 16 each adapted to receive the annular sensor package fixing portion 14 of one elastic member 4. The fitting grooves 16 are arranged at or proximate the opposite ends of the assistant member 8, respectively. In FIGS. 6a and 6b, reference numeral 17 designates assembling slits respectively adapted to allow the elastic support portions 13 of the elastic members 4 to pass therethrough, thereby allowing the elastic support portions 13 to reach the annular fitting grooves 16 and to be fitted around those annular fitting grooves 16 when the elastic members 4 are assembled with the assistant member 8, so that it does not interfere with the assembling of the elastic members 4 with the assistant member 8. Also, reference numeral 10 designates post terminals electrically connected to the signal output terminals 7 of the hydrophone 1, respectively. A signal line is connected to each post terminal 10. As shown in FIG. 3a, the signal lines extend through longitudinally-extending signal line holes 11 formed at the sensor package 3.

The assistant member 8 may be simply fitted in the sensor package 3 so that it is firmly held in the sensor package 3. Alternatively, the assistant member 8 may be fixedly mounted in the sensor package 3 by means of set screws 9, as shown in FIG. 3a, so that it is further firmly held in the sensor package 3.

In the embodiment illustrated in FIGS. 2 to 6b, two elastic members 4 are used, each of which includes two annular fixing portions 12 and 14, and a plurality of elastic support portions 13 radially connecting those fixing portions 12 and 14 together. Also, two fitting grooves 15 and two fitting grooves 16 are formed in the hydrophone 1 and the sensor package 3, respectively, so that they receive the respective fixing portions 12 and 14 of the two elastic members 4. However, the shape and number of the elastic members 4, and the mechanism for coupling the hydrophone to the sensor package using the elastic members 4 are not limited to those shown and described for the illustrated embodiment. As defined in the claims described hereinafter, the present invention has as a basic feature feature that the hydrophone is firmly held in the interior of the sensor package using the elastic members for achieving an attenuation of vibrations. The above-described embodiment is thus only an exemplary configuration implementing the basic feature of the present invention.

For the attenuation of vibrations, it is preferred for the elastic support portions of each elastic member to be symmetrically arranged, that is, equally spaced in a circumferential direction.

In order to reduce noises generated due to friction between the hydrophone 1 and the elastic members 4, it is preferred for the hydrophone fixing portion 12 of each elastic member 4 to have a minimum contact area contacting the hydrophone 1 insofar as there is no problem in supporting the hydrophone 1 by the minimum contact area.

The operation of the support structure according to the present invention will now be described.

When a towed array acoustic module M, to which the support structure of the present invention is applied, is towed by a towing vessel S, vibrations generated from the towing vessel S and strumming vibrations resulting from swirling flows generated around a towing cable C connected between the towing vessel S and the towed array acoustic module M are transmitted to sensor packages 3 via support ropes 2 arranged in the towed array acoustic module M. In the afore mentioned conventional structure in which the hydrophones 1 are held in the sensor packages in a state of being wrapped up in an open cell foam or closed cell foam, respectively, such vibrations are substantially transmitted to the hydrophones 1 as they are, thereby causing the hydrophones 1 to vibrate. Vibrations of the hydrophones 1 are exhibited in the form of noise in their output signals. Furthermore, to this noise is added frictional noise resulting from the friction generated between each hydrophone 1 and the foam wrapping or the like surrounding the hydrophones 1. In accordance with the present invention, however, each hydrophone 1 is coupled to the sensor package 3 by means of the elastic members 4, each of which is not in contact with the entire portion of the outer surface of the hydrophone 1, but only partially in contact with the outer surface of the hydrophone 1. Accordingly, the path serving to transmit, to the hydrophone 1, undesirable external vibrations received by the sensor package 3 is reduced. Also, vibrations possibly transmitted are sufficiently attenuated by the elastic members 4. Thus, the hydrophone 1 receives reduced vibrations. In addition, noise included in output signals due to the friction between the hydrophone 1 and the elastic members 4 are reduced because the contact area between each elastic member 4 and the hydrophone 1 is small.

Although there is a vibration attenuating effect even in the case of only using the elastic members 4 as mentioned above, as compared to the case when not using those elastic members, it is desirable for the elastic members, the insulating oil, and the structure of each hydrophone to have a natural frequency not higher than a frequency band of interest, that is, the frequency band of the acoustic waves to be received by the hydrophone. The reason therefor will be theoretically described hereinafter.

Figure 7:
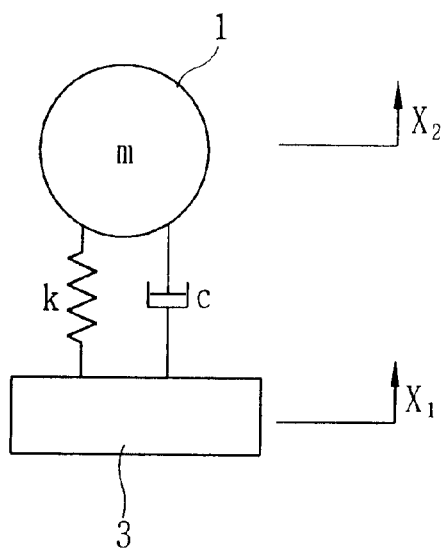
FIG. 7 is a schematic diagram of a 1-degree-of-freedom attenuated vibration model having a spring-damper-mass structure, for the hydrophone support structure of the present invention.
Figure 8:
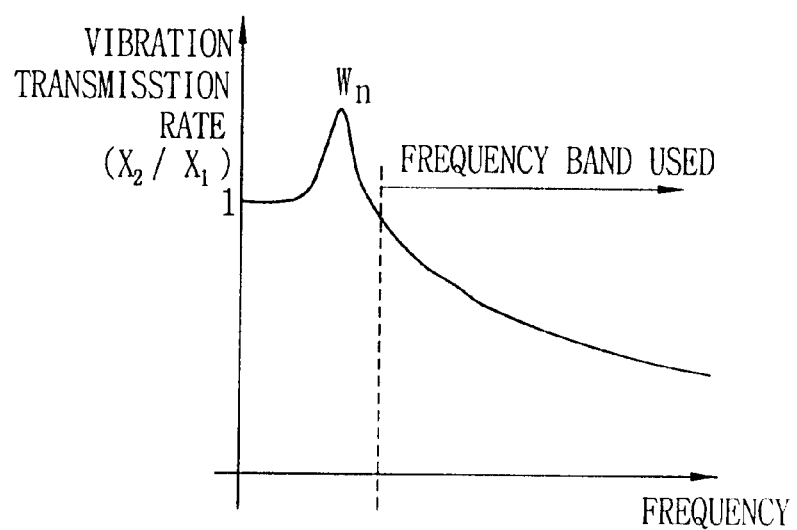
FIG. 8 is a graph depicting vibration transmission characteristics of the attenuated vibration model shown in FIG. 7.

FIG. 7 is a schematic diagram of a conceptual 1-degree-of-freedom attenuated vibration model having a spring-damper-mass structure, for the hydrophone support structure of the present invention. FIG. 8 is a graph depicting vibration transmission characteristics of the attenuated vibration model shown in FIG. 7.

As shown in FIGS. 7 and 8, the hydrophone support structure using the elastic members according to the present invention can be represented by a 1-degree-of-freedom attenuated vibration model in which the hydrophone 1 having a mass m is suspended by an elastic body having an equivalent spring constant k and an equivalent attenuation coefficient c. Here, "k" represents the equivalent spring constant of the elastic members 4, and "c" represents an equivalent attenuation coefficient of the insulating oil 5 surrounding the hydrophone and the elastic members 4. Such a vibration model has vibration transmission characteristics as shown in FIG. 8. That is, the vibration model has a natural or resonant frequency $W_n$ determined by the spring constant k and the mass m so that it exhibits a vibration transmission rate, $X_2/X_1$, of 1 for vibrations having a frequency less than the natural frequency $W_n$ while exhibiting, for vibrations having a frequency not lower than the natural frequency $W_n$, a vibration transmission rate reduced in proportion to the increase in the frequency of the vibrations. Here, "$X_1$" and "$X_2$" represent the magnitude of vibrations transmitted to the sensor package and the magnitude of vibrations transmitted to the hydrophone due to the vibrations of the sensor package, respectively. Accordingly, there is an effect of attenuating external vibrations when the frequency band of interest is not less than the resonant frequency. Thus, it is possible to reduce the noise included in the output signals.

As apparent from the above description, where the hydrophone support structure of the present invention is used, external vibrations, such as vibrations generated due to the running of the towing vessel or vibrations induced due to motions of the towing cable, which are irrespective of acoustic waves reflected by a target moving underwater, are attenuated during a transmission thereof from the sensor package to the hydrophones, so that the hydrophones are suppressed from vibrating due to the external vibrations. Accordingly, it is possible to reduce noise included in output signals of the hydrophones, thereby achieving an improvement in the sensing performance of the towed array sonar system.

As compared to conventional cases in which an open cell foam is used to completely surround the outer surface of each hydrophone, there is no or little noise resulting from friction in accordance with the present invention. Accordingly, it is possible to greatly reduce the noise included in output signals of the hydrophones, thereby achieving a great improvement in the sensing performance of the towed array sonar system.

Although the preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. In a towed array acoustic module for a towed array sonar system including a plurality of sensor packages aligned in an elastic hose filled with an insulating oil, the sensor packages being connected to one another and supported by support ropes while being spaced apart from one another, and a plurality of hydrophones carried in an associated one of the sensor packages, a hydrophone support structure comprising:
  a plurality of elastic members arranged in an associated one of the sensor packages and adapted to support an associated one of the hydrophones in the associated sensor package while attenuating vibrations transmitted to the associated sensor package,
  wherein the elastic member comprises;
    an annular hydrophone fixing portion fixedly mounted to the associated hydrophone;
    an annular sensor package fixing portion fixedly mounted to the associated sensor package; and
    a plurality of elastic support portions each connected radially between the hydrophone fixing portion and the sensor package fixing portion and adapted to attenuate vibrations.

2. The hydrophone support structure according to claim 1, wherein the elastic member is configured to allow a structure comprising the elastic member, the associated hydrophone and the insulating oil to have a natural frequency not higher than a frequency band of acoustic waves to be received by the associated hydrophone.

3. The hydrophone support structure according to claim 1, wherein the elastic support portions of the elastic member are symmetrically arranged in a circumferential direction around the associated hydrophone.

4. The hydrophone support structure according to claim 3, wherein the elastic member is configured to allow a structure comprising the elastic member, the associated hydrophone and the insulating oil to have a natural frequency not more than a frequency band of acoustic waves to be received by the associated hydrophone.

5. The hydrophone support structure according to claim 1, wherein a pair of the elastic members support an associated one of the hydrophones.

6. The hydrophone support structure according to claim 5, wherein the elastic member is configured to allow a structure comprising the elastic member, the associated hydrophone and the insulating oil to have a natural frequency not higher than a frequency band of acoustic waves to be received by the associated hydrophone.

7. The hydrophone support structure according to claim 5, wherein the elastic support portions of the elastic member are symmetrically arranged in a circumferential direction around the associated hydrophone.

8. The hydrophone support structure according to claim 7, wherein the elastic member is configured to allow a structure comprising the elastic member, the associated hydrophone and the insulating oil to have a natural frequency not more than a frequency band of acoustic waves to be received by the associated hydrophone.

9. The hydrophone support structure according to claim 1, wherein a plurality of signal lines extend through longitudinally-extending signal line holes formed at the sensor packages.

10. The hydrophone support structure according to claim 9, wherein the elastic member is configured to allow a structure comprising the elastic member, the associated hydrophone and the insulating oil to have a natural frequency not higher than a frequency band of acoustic waves to be received by the associated hydrophone.

11. The hydrophone support structure according to claim 9, wherein the elastic support portions of the elastic member are symmetrically arranged in a circumferential direction around the associated hydrophone.

12. The hydrophone support structure according to claim 11, wherein the elastic member is configured to allow a structure comprising the elastic member, the associated hydrophone and the insulating oil to have a natural frequency not more than a frequency band of acoustic waves to be received by the associated hydrophone.

13. The hydrophone support structure according to claim 9, wherein a plurality of signal output terminals of the respective hydrophones are electrically connected to a plurality of post terminals fixed to the associated sensor package.

14. The hydrophone support structure according to claim 1, further comprising an annular assistant member for fixing the respective annular sensor package fixing portions of the elastic members to the associated sensor package.

15. The hydrophone support structure according to claim 14, wherein the annular assistant member is formed with a plurality of annular grooves on an outer circumferential surface thereof, in which the annular sensor package fixing portion of the elastic member is inserted, and with a plurality of through holes at the annular groove, through which through holes the elastic support portions of the elastic member pass.

16. The hydrophone support structure according to claim 15, wherein the elastic member is configured to allow a structure comprising the elastic member, the associated hydrophone and the insulating oil to have a natural frequency not higher than a frequency band of acoustic waves to be received by the associated hydrophone.

* * * * *